United States Patent
Yajnanarayana et al.

(10) Patent No.: US 11,956,031 B2
(45) Date of Patent: Apr. 9, 2024

(54) COMMUNICATION OF MEASUREMENT RESULTS IN COORDINATED MULTIPOINT

(71) Applicant: Telefonaktiebolaget LM Ericsson (publ), Stockholm (SE)

(72) Inventors: Vijaya Yajnanarayana, Bangalore (IN); Alexandros Palaios, Moers (DE); Ursula Challita, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 160 days.

(21) Appl. No.: 17/774,767

(22) PCT Filed: Nov. 26, 2019

(86) PCT No.: PCT/SE2019/051201
§ 371 (c)(1),
(2) Date: May 5, 2022

(87) PCT Pub. No.: WO2021/107829
PCT Pub. Date: Jun. 3, 2021

(65) Prior Publication Data
US 2022/0385336 A1 Dec. 1, 2022

(51) Int. Cl.
*H04B 7/02* (2018.01)
*G06N 20/00* (2019.01)
(Continued)

(52) U.S. Cl.
CPC .............. *H04B 7/024* (2013.01); *G06N 20/00* (2019.01); *H04B 7/0663* (2013.01)

(58) Field of Classification Search
CPC ....... H04B 7/024; H04B 7/0663; G06N 20/00
(Continued)

(56) References Cited

U.S. PATENT DOCUMENTS

2019/0287217 A1 9/2019 Cooke et al.
2020/0259528 A1* 8/2020 Zhang ................... H04L 5/0035

FOREIGN PATENT DOCUMENTS

GB 2562098 A 11/2018

OTHER PUBLICATIONS

Yang, Q., et al., "Deep Convolutional Compression for Massive MIMO CSI Feedback", IEEE 29th International Workshop on Machine Learning for Signal Processin, Oct. 13, 2019, pp. 1-6, IEEE.
(Continued)

*Primary Examiner* — Zewdu A Kassa
(74) *Attorney, Agent, or Firm* — COATS & BENNETT, PLLC

(57) ABSTRACT

Communication of Measurement Results in Coordinated Multipoint Methods (200, 400, 600) performed by a wireless device (1100), Radio Access node 5 (1300) and training agent (1500) are disclosed. The wireless device is operable to receive signals over a communication channel from a Transmission Point (TP) of a communication network, which TP is a member of a Coordinated Multipoint (CoMP) set and may be managed by the Radio Access node. The method (200) performed by the wireless device comprises performing a measurement on communication channels to 0 each of a plurality of TPs in the CoMP set (210), and using an autoencoder to compress a vector of measurement results of the performed measurements (220). The method further comprises transmitting the compressed vector of measurement results to TPs in the CoMP set (230) and receiving a joint transmission from TPs in the CoMP set (240). The autoencoder comprises an autoencoder that has been trained by a training agent 5 for use by wireless devices in a coverage area of the CoMP set.

20 Claims, 15 Drawing Sheets

(51) Int. Cl.
  *H04B 7/024* (2017.01)
  *H04B 7/06* (2006.01)
(58) Field of Classification Search
  USPC .............. 375/267, 260, 259, 219, 295, 316
  See application file for complete search history.

(56) References Cited

OTHER PUBLICATIONS

Yajnanarayana V., Joint Estimation of TOA and PPM Symbols Using Sub-Nyquist Sampled IR-UWB Signal', EEE Communications Letters, vol. 21, No. 4, Apr. 1, 2017, pp. 949-952, IEEE.
Määttänen H., "System-level performance of LTE-Advanced with joint transmission and dynamic point selection schemes", EURASIP Journal on Advances in Signal Processing, Jan. 1, 2012, pp. 1-18, Springer.
Alcatel-Lucent, "Comparison of CSI Feedback Schemes", 3GPP TSG-RAN WG1 #58, Shenzhen, China, Aug. 24, 2008, pp. 1-11, R1-093343, 3GPP.
Zhang C. et al., "Deep Learning in Mobile and Wireless Networking: A Survey",, IEEE Communications Surveys & Tutorials, vol. 21, No. 3, Third Quarter, Jan. 1, 2019, pp. 2224-2287, IEEE.
Ramprashad S., et al., "A Joint Scheduling and Cell Clustering Scheme for MU-MIMO Downlionk with Limited Coordination", 2010 IEEE International Conference on Communications, Cape Town, Jan. 1, 2010, pp. 1-6, IEEE.

\* cited by examiner

Algorithm 1: Training Algorithm

Input: Collection of channel impulse responses, ($h_i$'s), Size of collection=$C$
Output: Trained Encoder and Decoder Neural Network Model
1   for $i \leftarrow$ 1 to $C$ do
2       Do Feed-Forward pass for the auto-encoder structure to compute $h_i'$ at the output
3       Measure the loss ($\|h_i' - h_i\|$)
4       Backpropagate the error through the network and perform weight updates.
5   return *TrainedModels*

FIG. 10

COMMUNICATION OF MEASUREMENT RESULTS IN COORDINATED MULTIPOINT

TECHNICAL FIELD

The present disclosure relates to methods performed by a wireless device, a Radio Access node and a training agent. The present disclosure also relates to a wireless device, a Radio Access not, a training agent and to a computer program and a computer program product configured, when run on a computer to carry out methods performed by a wireless device, Radio Access node and training agent.

BACKGROUND

Coordinated multipoint (CoMP) transmission and reception techniques use multiple transmit and receive antennas from multiple antenna site locations to enhance received signal quality as well as decrease received spatial interference. Spatial diversity in the propagation environment of a radio channel ensures that transmitting a message for a single user through multiple interfering antenna sites can result in improved received signal quality. The multiple antenna site locations may or may not belong to the same network cell.

Joint Transmission is a CoMP technique according involving simultaneous transmission of data to a UE terminal from multiple cooperating Transmission Point (TPs), where a TP comprises a set of geographically co-located transmit antennas (including for example a Remote Radio Head), and where a single network cell may comprise one or more TPs. Considering a Joint Transmission to K users (UEs) from N TPs, the received signal can be represented as:

$$y = Hx + w \quad (1)$$

Where:

$x \in C^N$ with each individual element of x: $x_i$, $i \in [1, \ldots, N]$ comprising the transmitted signal from the i-th cell;

$y \in C^K$ with each individual element of y, $y_i$, $i \in [1, \ldots, K]$ comprising the received signal at the i-th UE;

$w = [w_1, \ldots, w_K]^T$ comprises the independent and identically distributed (iid) noise at the receiver with distribution, $\mathcal{N}(0, \sigma_i^2)$ $i \in [1, \ldots, K]$;

and H is the channel matrix.

In order for a Joint Transmission scheme to operate effectively, the transmitters at each TP require channel state information (CSI) for channels to each receiving UE, allowing the TPs to select appropriate precoding of signals to each UE. UEs therefore transmit CSI information in the uplink to TPs participating in Joint Transmission schemes, and this CSI information is used for precoder selection in the Joint Transmission scheme for downlink. This requirement for all UEs receiving a Joint Transmission to provide accurate CSI information to all TPs participating in the Joint Transmission places a heavy signalling load on the Uplink communication channels between UEs and the communication network.

In S. A. Ramprashad, G. Caire, and H. C. Papadopoulos, "A joint scheduling and cell clustering scheme for mu-mimo downlink with limited coordination," in 2010 IEEE International Conference on Communications, May 2010, pp. 1-6, the authors propose a new scheme that seeks to address the heavy CSI feedback required for Joint Transmission through clustering of base stations. However, the process of clustering base stations is relatively complex, rendering the scheme inefficient. The issue of significant uplink signalling required for carrying out Joint Transmission in the Downlink therefore remains an open challenge.

SUMMARY

It is an aim of the present disclosure to provide a wireless device, Radio Access node, training agent and computer readable medium which at least partially address one or more of the challenges discussed above. It is a further aim of the present disclosure to provide a wireless device, Radio Access node, training agent and computer readable medium which cooperate to reduce Uplink control traffic associated with Coordinated Multipoint transmission techniques.

According to a first aspect of the present disclosure, there is provided a method performed by a wireless device, wherein the wireless device is operable to receive signals over a communication channel from a Transmission Point (TP) of a communication network, which TP is a member of a Coordinated Multipoint (CoMP) set. The method comprises performing a measurement on communication channels to each of a plurality of TPs in the CoMP set and using an autoencoder to compress a vector of measurement results of the performed measurements. The method further comprises transmitting the compressed vector of measurement results to TPs in the CoMP set and receiving a joint transmission from TPs in the CoMP set. The autoencoder comprises an autoencoder that has been trained by a training agent for use by wireless devices in a coverage area of the CoMP set.

According to examples of the present disclosure, using an autoencoder to compress a vector of measurement results may have the effect of reducing a dimensionality of the measurement results. The subsequent transmission of the compressed vector of measurement results to TPs in the CoMP set therefore represents a lighter signalling load that transmitting an uncompressed vector of the measurement results. The autoencoder, having been trained by a training agent for use by wireless devices in a coverage area of the CoMP set, is able to reduce the dimensionality of the measurement results with minimal information loss, such that a Radio Access node managing a TP receiving such compressed results may use a similar autoencoder to reconstruct a the measurement results. The measurement results may then be used by the Radio Access node to form a precoding vector for transmissions to the wireless device, in accordance with a CoMP Joint Transmission scheme.

According to examples of the present disclosure, the autoencoder that has been trained by a training agent for use by wireless devices in a coverage area of the CoMP set may comprise an encoder part and a decoder part. According to such examples, using the autoencoder to compress a vector of measurement results of the performed measurements may comprise using the encoder part of the autoencoder to compress the vector of measurement results. In some examples, only the functionality of the encoder part of the autoencoder may be implemented in the wireless device, with the functionality of the decoder part of the autoencoder being implemented in a Radio Access node, as discussed below.

According to another aspect of the present disclosure, there is provided a method performed by a Radio Access node, wherein the Radio Access node is configured to manage a Transmission Point that is a member of a CoMP set. The method comprises receiving from a wireless device a compressed vector of measurement results of measurements performed by the wireless device on communication channels to each of a plurality of TPs in the CoMP set. The method further comprises using an autoencoder to reconstruct a vector of measurement results from the received compressed vector of measurement results, and using the reconstructed vector of measurement results to form a precoding vector for transmissions to the wireless device. The method further comprises encoding data for transmission to the wireless device using the precoding vector, and causing the encoded data to be transmitted to the wireless device. The autoencoder comprises an autoencoder that has been trained by a training agent for use by Radio Access nodes managing TPs that are members of the CoMP set.

According to examples of the present disclosure, the autoencoder that has been trained by a training agent for use by Radio Access nodes managing TPs that are members of the CoMP set may comprise an encoder part and a decoder part. According to such examples, using the autoencoder to reconstruct a vector of measurement results from the received compressed vector of measurement results may comprise using the decoder part of the autoencoder to reconstruct a vector of measurement results. In some examples, only the functionality of the decoder part of the autoencoder may be implemented in the Radio Access node, with the functionality of the encoder part of the autoencoder being implemented in a wireless device, as discussed above.

According to another aspect of the present invention, there is provided a method for training an autoencoder for use by Radio Access nodes configured to manage Transmission Points (TPs) that are members of a CoMP set, and by wireless devices in a coverage area of the CoMP set. The method is performed by a training agent and comprises obtaining results of measurements performed by a wireless device on communication channels to each of a plurality of TPs in the CoMP set. The method further comprises using the obtained results to train an autoencoder to compress a vector of measurement results, the autoencoder comprising an encoder part and a decoder part. The method further comprises providing a representation of the decoder part of the autoencoder to Radio Access nodes configured to manage TPs that are members of the CoMP set, and a representation of the encoder part of the autoencoder to wireless devices that are in a coverage area of the CoMP set.

According to another aspect of the present disclosure, there is provided a computer program and a computer program product configured, when run on a computer to carry out methods as set out above.

According to another aspect of the present disclosure, there is provided a wireless device, Radio Access node and training agent, each of the wireless device, Radio Access node and training agent comprising processing circuitry configured to cause the wireless device, Radio Access node and training agent respectively to carry out methods as set out above.

BRIEF DESCRIPTION OF THE DRAWINGS

For a better understanding of the present disclosure, and to show more clearly how it may be carried into effect, reference will now be made, by way of example, to the following drawings in which:

FIG. 10 illustrates a training algorithm;

DETAILED DESCRIPTION

Aspects of the present disclosure provide methods a wireless device, a Radio Access node and a training agent that cooperate to reduce the control signalling load associated with CoMP transmission techniques. In a typical cellular communication network, macro diversity gain can be achieved in the Downlink by jointly transmitting a message for a single user through multiple interfering Transmission Points (TPs). In order for the Radio Access nodes controlling the TPs to ensure a transmitted signal is correctly received at the intended user, the Radio Access nodes need accurate Channel State Information (CSI), enabling them to select an appropriate pre-coder at the TPs. This requirement for CSI feedback causes a heavy Uplink signalling load which aspects of the present disclosure seek to reduce through the use of an autoencoder to reduce the dimensionality of measurement results for transmission by a UE, and to reconstruct measurement results at a Radio Access node.

Figure 1:
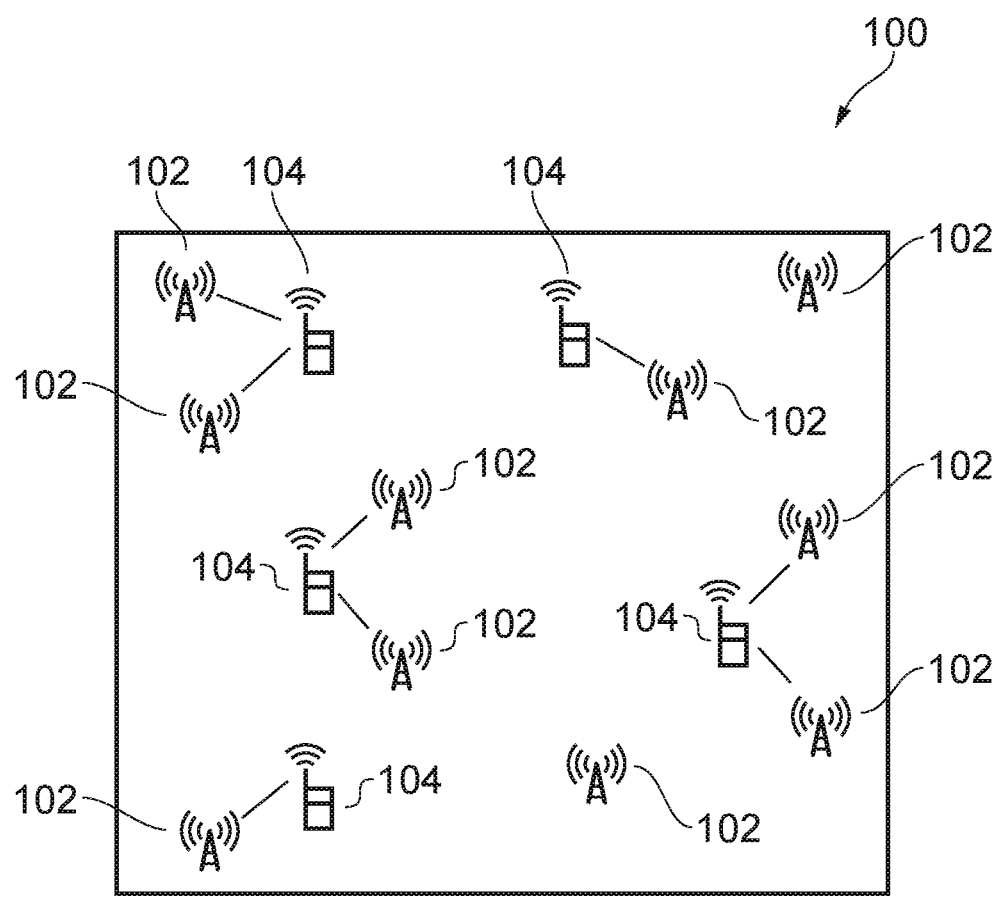
FIG. 1 illustrates a Coordinated Multipoint (CoMP) network.

FIG. 1 illustrates a typical CoMP network 100 with number N of TPs 102 N=10 and a number K of jointly served users or UEs 104, K=5. In the illustrated example, each TP is under the control of a single Radio Access node or base station, however it will be appreciated that this is merely one example, and in many deployment scenarios, a plurality of TPs may be under the control of a single Radio Access node. For example, a Radio Access node may comprise a baseband unit (BBU), which performs scheduling and baseband processing, and one or more remote radio head (RRH), which is responsible for Radio Frequency operations including carrier frequency transposition, filtering, power amplification etc. The BBU and RRH(s) may be separated by many hundreds of meters, with low latency connectivity between them (for example an optical fronthaul). In this example deployment scenario, each RRH corresponds to a single TP, with one or more TPs being associated with a single Radio Access node, base station or network cell.

Referring to FIG. 1, each UE 104 may be able to receive signals from one or more of the TPs 102. The solid lines connecting UEs 104 to TPs 102 in FIG. 1 indicate favourable signal reception, or good channel conditions, between a TP 104 and a UE 102 in the Downlink. In many networks, as illustrated in FIG. 1, Downlink joint transmissions from only a few TPs may be received at any one UE, with remaining TPs signals being attenuated before reaching the UE. This attenuation of TPs signals may be caused by large geographic separation, if the network covers a significant geographic area using widely spaced TPs, or it could be caused by multiple obstacles such as buildings in a highly urbanised propagation environment. In many networks, the channel matrix H, representing communication channels between UEs and TPs, is therefore relatively sparse. Considering equation 1, and writing it in the following form:

$$\begin{bmatrix} y_1 \\ y_2 \\ \vdots \\ y_K \end{bmatrix} = \begin{bmatrix} h_1^T x \\ h_2^T x \\ \vdots \\ h_K^T x \end{bmatrix} + w \quad (2)$$

the vector $h_i^T \in C^{1 \times N}$ for individual UEs i is sparse. Aspects of the present disclosure propose to exploit this characteristic of the channel vector h and compress this vector before transmission. In many sparse signal processing methods, a basis or compressive sampling dictionary is identified, using which the signal can be sparsely represented with few support (index of non-zero value) and value pairs. Such techniques could be used to generate a compact representation of the channel vector h. However, identifying a basis or compressive sampling dictionary is a complex process, placing undesirable additional load on UEs and network. Aspects of the present disclosure propose the use of an autoencoder to compress the channel vector h before transmission to TPs, so reducing the uplink signalling load associated with supporting CoMP joint transmissions, without imposing excessive additional load on the UE or network.

An autoencoder is a type of machine learning algorithm that may be used to concentrate data. Autoencoders are trained to take a set of input features and reduce the dimensionality of the input features, with minimal information loss. Training of the autoencoder proposed in the present disclosure is discussed in greater detail below. Briefly, training an autoencoder is generally an unsupervised process, with the autoencoder divided into two parts: an encoding part or encoder and a decoding part or decoder. The encoder and decoder may comprise, for example, deep neural networks comprising layers of neurons. An encoder successfully encodes or compresses the data if the decoder is able to restore the original data stream with a tolerable loss of data. Training may comprise reducing a loss function describing the difference between the input (raw) and output (decoded) data. Training the encoder part thus involves optimising the data loss of the encoder process. An autoencoder may be considered to concentrate the data (for example as opposed to merely reducing the dimensionality) because essential or prominent features in the data are not lost.

FIGS. 2 to 7b are flow charts illustrating methods that may be performed at a wireless device such as a UE, a Radio Access node such as a base station, and a training agent. The methods may cooperate to achieve the reduced control signalling load discussed above.

Figure 2:
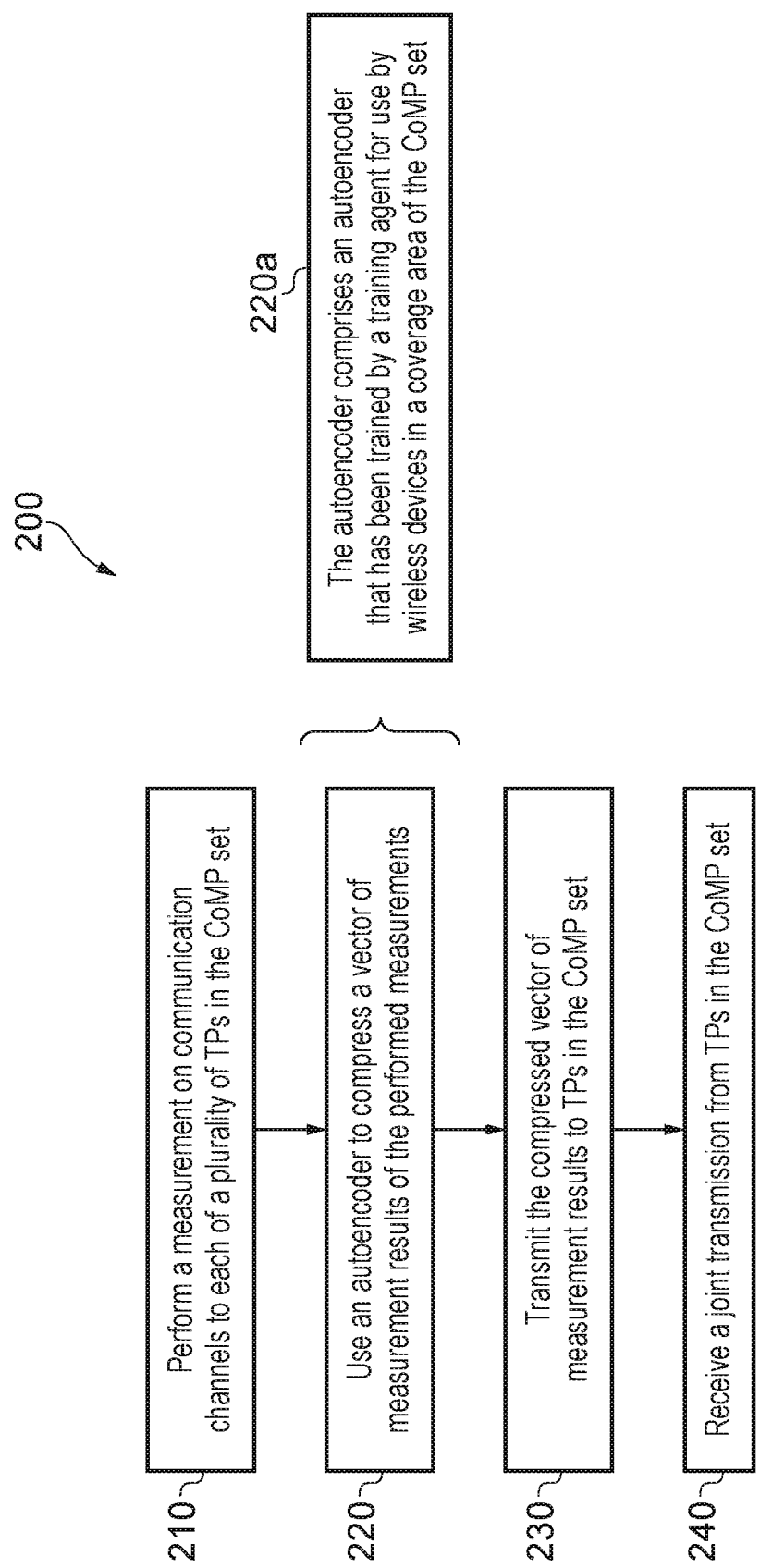
FIG. 2 is a flow chart illustrating process steps in a method performed by a wireless device.

FIG. 2 is a flow chart illustrating process steps in a method 200 performed by a wireless device, such as a UE. The wireless device is operable to receive signals over a communication channel from a Transmission Point (TP) of a communication network, which TP is a member of a Coordinated Multipoint (CoMP) set. As discussed above, a TP comprises a set of geographically co-located transmit antennas (including for example a Remote Radio Head), where a single network cell may comprise one or more TPs. A CoMP set comprises a set of geographically separated TPs that are participating in data transmission to a wireless device. The combined geographical coverage area of the TPs in a CoMP set is referred to below as the coverage area of the CoMP set. Further detail regarding TPs and CoMP sets can be found in the 3GPP Technical Report TR 36.819.

Referring to FIG. 2, the method 200 first comprises, in step 210, performing a measurement on communication channels to each of a plurality of TPs in the CoMP set. The method then comprises using an autoencoder to compress a vector of measurement results of the performed measurements in step 220. As illustrated at 220a, the autoencoder comprises an autoencoder that has been trained by a training agent for use by wireless devices in a coverage area of the CoMP set. Training of such as autoencoder is discussed below with reference to FIGS. 6, 7a and 7b. Referring still to FIG. 2, the method 200 further comprises transmitting the compressed vector of measurement results to TPs in the CoMP set in step 230 and, in step 240, receiving a joint transmission from TPs in the CoMP set.

According to examples of the present disclosure, management of the CoMP set, including determining which TPs are to be included in a CoMP set and how many UEs are to be served by the CoMP set, may be carried out according to any suitable procedures, including those already standardised for example in 3GPP TR 36.819. Membership of a CoMP set by a particular TP may or may not be transparent to the wireless device performing the method.

Figure 3:
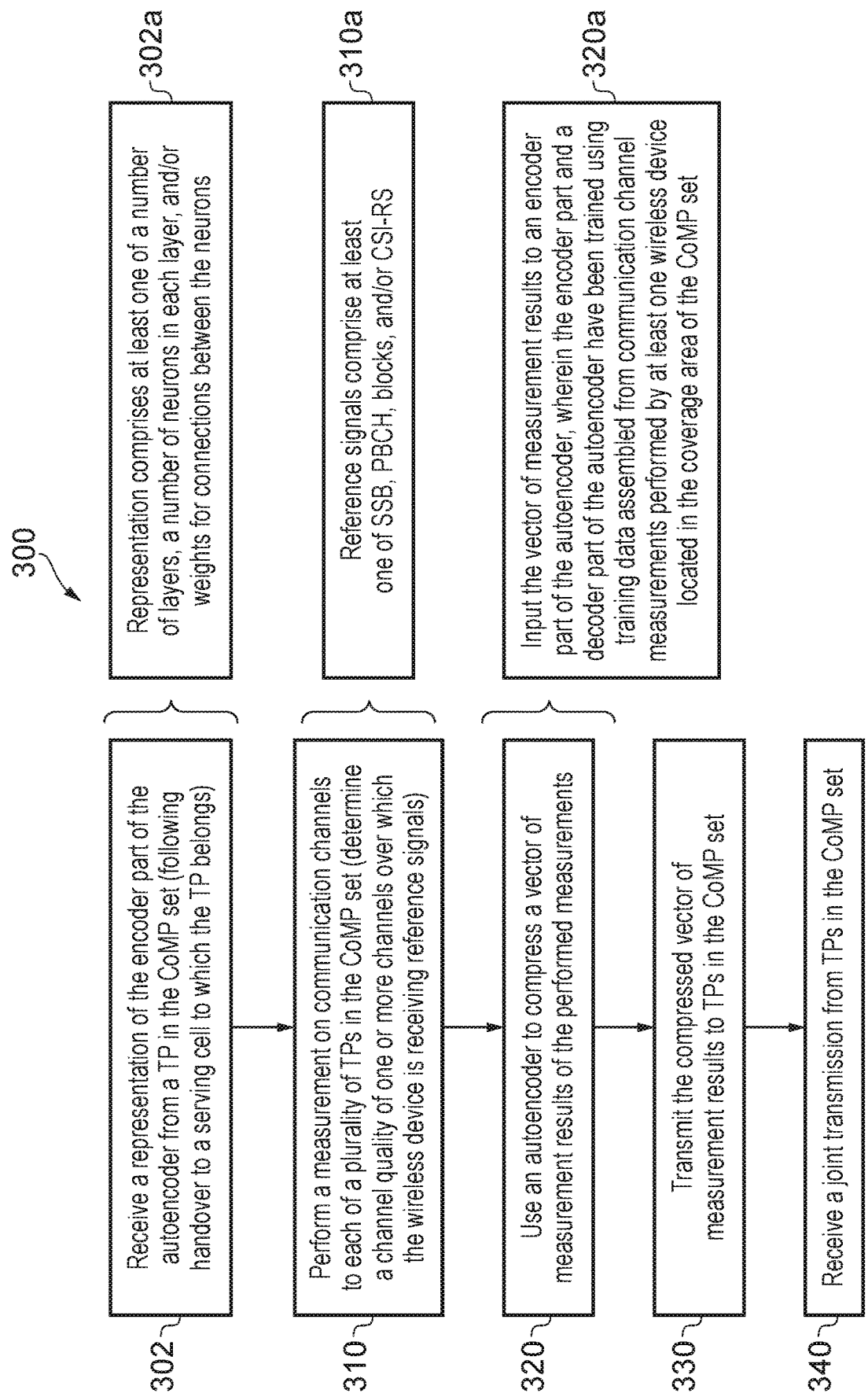
FIG. 3 is a flow chart illustrating process steps in another example of method performed by a wireless device.

FIG. 3 is a flow chart illustrating process steps in another example of method 300 performed by a wireless device. The method 300 provides one example of how the steps of the method 200 may be implemented and supplemented to achieve the above discussed and additional functionality. As for the method 200 of FIG. 2, the wireless device performing the method 300 is operable to receive signals over a communication channel from a TP of a communication network, which TP is a member of a set. Referring to FIG. 3, the method comprises, in a first step 302, receiving a representation of the encoder part of an autoencoder from a TP in the CoMP set. In some examples, the autoencoder comprises an autoencoder that has been trained by a training agent for use by wireless devices in a coverage area of the CoMP set. As illustrated at 302, the representation of the encoder part may be received from the TP following handover to a serving cell to which the TP belongs. As illustrated at 302a, the representation of the encoder part of the autoencoder may comprise at least one of a number of layers in the encoder part, a number of neurons in each layer of the encoder part and/or weights for connections between the neurons of the encoder part. The representation is sufficient for the wireless device to construct and use the encoder part of the autoencoder.

In step 310 of the method 300, the wireless device performs a measurement on communication channels to each of a plurality of TPs in the CoMP set. This may comprise determining a channel quality of one or more channels over which the wireless device is receiving reference signals. As illustrated at 310a, the reference signals may comprise at least one of synchronization signal blocks (SSB), Physical Broadcast Channel (PBCH) blocks, and/or Chanel Status Information Reference Signals (CSI-RS). Other reference signals may also be envisaged.

In step 320, the wireless device uses an autoencoder to compress a vector of measurement results of the performed measurements, so as to reduce a dimensionality of the measurement results, wherein the autoencoder comprises an autoencoder that has been trained by a training agent for use by wireless devices in a coverage area of the CoMP set. As illustrated at 320a, this may comprise inputting the vector of measurement results to an encoder part of the autoencoder, wherein the encoder part and a decoder part of the autoencoder have been trained using training data assembled from communication channel measurements performed by at least one wireless device located in the coverage area of the CoMP set. The encoder part trained as set out above may comprise an encoder part according to the representation received in step 302. The wireless device may thus construct the encoder part according to the received representation, and use the encoder part by inputting the vector of measurement results.

In step 330, the wireless device transmits the compressed vector of measurement results to TPs in the CoMP set, and, in step 340, the wireless device then receives joint transmission from TPs in the CoMP set.

The methods 200 and/or 300, performed by a wireless device such as a UE, may be complimented by methods 400, 500 performed by a Radio Access node and methods 600, 700 performed by a training agent.

Figure 4:
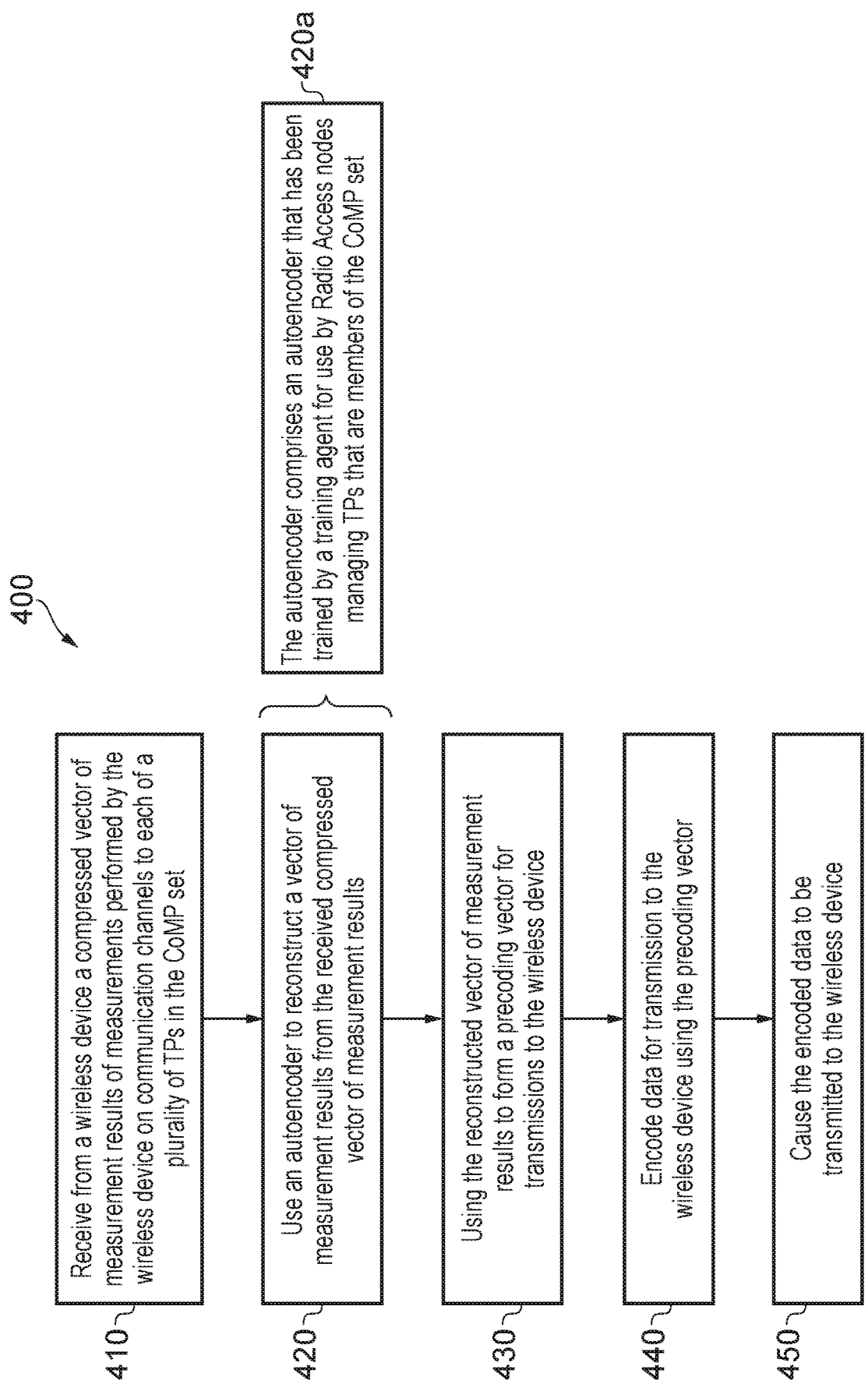
FIG. 4 is a flow chart illustrating process steps in a method performed by a Radio Access node.

FIG. 4 is a flow chart illustrating process steps in a method 400 performed by a Radio Access node such as a base station. The Radio Access node is configured to manage a TP that is a member of a CoMP set. In some examples, the Radio Access node may manage a plurality of TPs, and the one or more managed TPs may be co-located with the Radio Access node, or may be geographically separated from the Radio Access node, for example in the case of a base station comprising a BBU and one or more RRH(s) connected by an optical fronthaul. The CoMP set may comprise TPs managed by one or more Radio Access nodes.

Referring to FIG. 4, the method comprises, in a first step 410, receiving from a wireless device a compressed vector of measurement results of measurements performed by the wireless device on communication channels to each of a plurality of TPs in the CoMP set. The compressed vector may be received from the wireless device via one or more receive antennas managed by the Radio Access node. As discussed in further detail below, the Radio Access node may in some examples receive a plurality of compressed vectors, one vector from each of a plurality of wireless devices being served by the CoMP set. Subsequent method steps may thus be performed multiple times, once for each of the received compressed vectors.

Referring still to FIG. 4, in step 420, the Radio Access node uses an autoencoder to reconstruct a vector of measurement results from the received compressed vector of measurement results. A illustrated at 420a, the autoencoder comprises an autoencoder that has been trained by a training agent for use by Radio Access nodes managing TPs that are members of the CoMP set. The Radio Access node then, at step 430, uses the reconstructed vector of measurement results to form a precoding vector for transmissions to the wireless device. In step 440, the Radio Access node encodes data for transmission to the wireless device using the precoding vector, and in step 450, the Radio Access node causes the encoded data to be transmitted to the wireless device. Causing the encoded data to be transmitted to the wireless device may comprise sending the encoded data to the one or more TPs managed by the Radio Access node for transmission to the wireless device.

Figure 5:
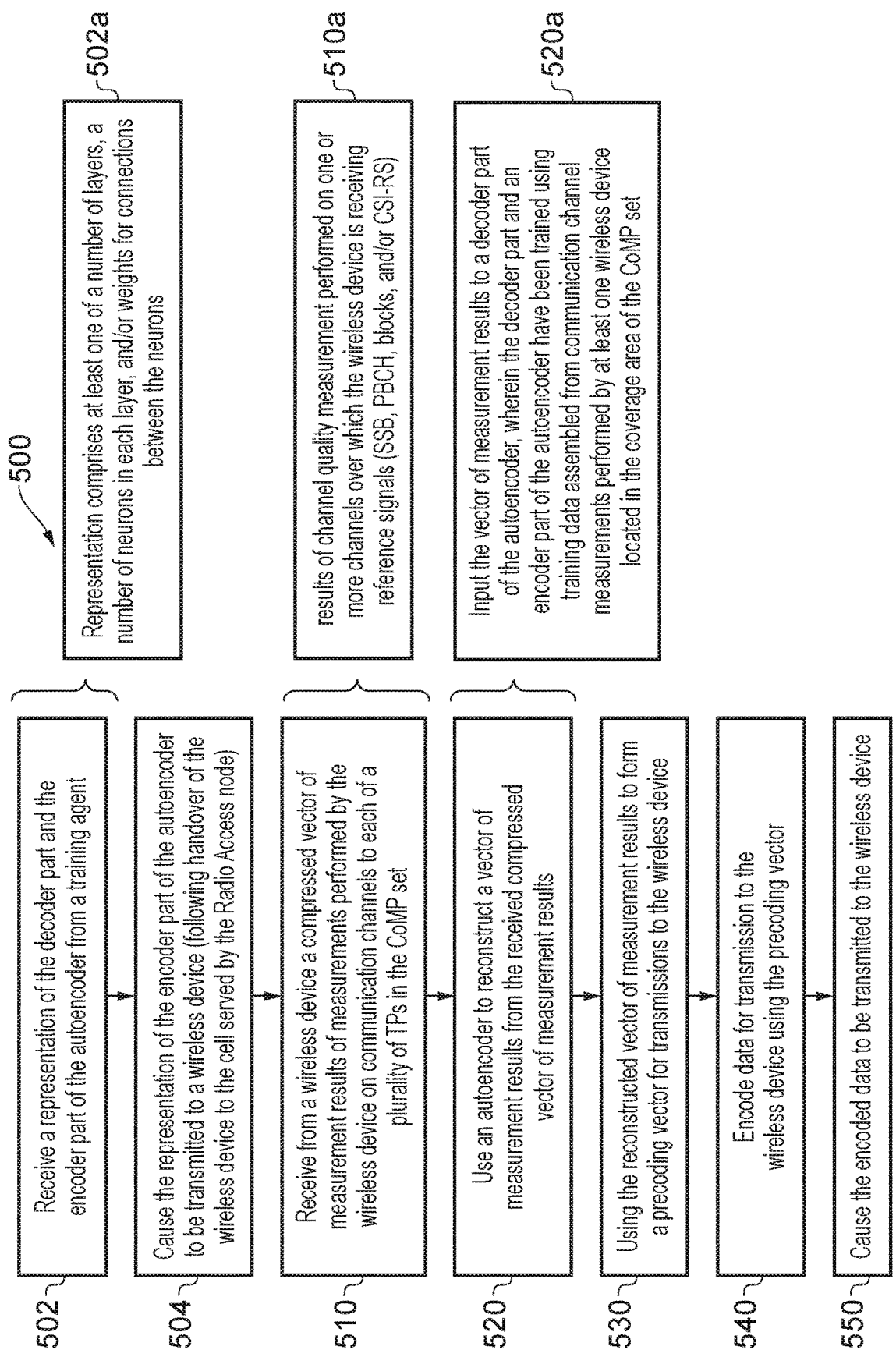
FIG. 5 is a flow chart illustrating process steps in another example of method performed by a Radio Access node.

FIG. 5 is a flow chart illustrating process steps in another example of method 500 performed by a Radio Access node. The method 500 provides one example of how the steps of the method 400 may be implemented and supplemented to achieve the above discussed and additional functionality. As for the method 400 of FIG. 4, the Radio Access node is configured to manage a TP that is a member of a CoMP set. In some examples, the Radio Access node may manage a plurality of TPs, and the one or more managed TPs may be co-located with the Radio Access node, or may be geographically separated from the Radio Access node, for example in the case of a base station comprising a BBU and one or more RRH(s) connected by an optical fronthaul. The CoMP set may comprise TPs managed by one or more Radio Access nodes.

Referring to FIG. 5, in a first step 502, the Radio Access node receives a representation of an encoder part and a decoder part of an autoencoder from a training agent. In some examples, the autoencoder comprises an autoencoder that has been trained by a training agent for use by Radio Access nodes managing TPs that are members of the CoMP set. As illustrated at 502a, the representation of the encoder part and/or the decoder part of the autoencoder may comprise at least one of a number of layers in the encoder and/or decoder part, a number of neurons in each layer of the encoder and/or decoder part and/or weights for connections between the neurons of the encoder and/or decoder part. The representation is sufficient for the Radio Access node to construct and use the decoder part of the autoencoder.

In step 504, the Radio Access node causes the representation of the encoder part of the autoencoder to be transmitted to a wireless device. This may take place following handover of the wireless device to the cell served by the Radio Access node, and may involve sending the representation of the encoder part to one or more managed TPs for transmission to the Wireless Device. The Radio Access node then, in step 510, receives from a wireless device a compressed vector of measurement results of measurements performed by the wireless device on communication channels to each of a plurality of TPs in the CoMP set. The wireless device may be the wireless device to which the representation of the encoder part of the autoencoder was sent in step 504. As illustrated at 510a, the vector of measurement results may comprise results of channel quality measurements performed on one or more channels over which the wireless device is receiving reference signals. The reference signals may comprise at least one of synchronization signal blocks (SSB), Physical Broadcast Channel (PBCH) blocks, Channel Status Information Reference Signals (CSI-RS), or any other reference signals. As discussed above, step 510 may comprise receiving a plurality of compressed vector of measurement results, one compressed vector from each of a plurality of wireless devices being served by the CoMP set. The subsequent method steps may therefore be performed multiple times, once for each of the plurality of received compressed measurement vectors.

In step 520, the Radio Access node uses an autoencoder to reconstruct a vector of measurement results from the received compressed vector of measurement results, wherein the autoencoder comprises an autoencoder that has been trained by a training agent for use by Radio Access nodes managing TPs that are members of the CoMP set. As illustrated at 520a, this may comprise inputting the compressed vector of measurement results to a decoder part of the autoencoder, wherein the decoder part and an encoder part of the autoencoder have been trained using training data assembled from communication channel measurements performed by at least one wireless device located in the coverage area of the CoMP set. The decoder part may be a decoder part corresponding to the representation received in step 502, and the Radio Access node may thus construct the decoder part according to the received representation, and use the decoder part by inputting the compressed vector of measurement results.

In step 530, the Radio Access node uses the reconstructed vector of measurement results to form a precoding vector for transmissions to the wireless device. The Radio Access node then encodes data for transmission to the wireless device using the precoding vector in step 540 and causes the encoded data to be transmitted to the wireless device in step 550. In many examples, as discussed above, the Radio Access node may perform the steps 520 to 550 for each of a plurality of received compressed vectors, and may in step 550 cause encoded data to be transmitted simultaneously to a plurality of wireless devices served by the CoMP set. The data for each wireless device will be encoded using a precoding vector generated using a reconstructed vector of measurement results based on a compressed vector of measurement results received from the particular wireless device. Each reconstructed vector may have been generated using the same decoding part of an autoencoder that has been trained using training data assembled from communication channel measurements performed by at least one wireless device located in the coverage area of the CoMP set.

Figure 6:
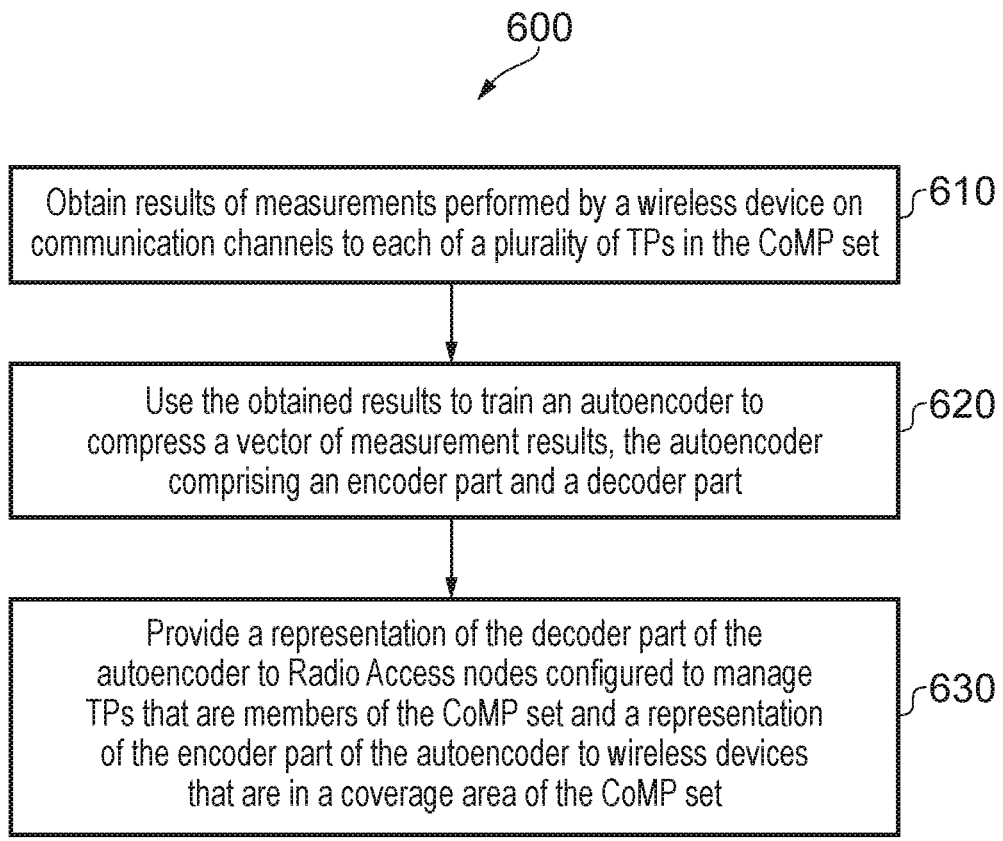
FIG. 6 is a flow chart illustrating process steps in a method performed by a training agent.

FIG. 6 is a flow chart illustrating process steps in a method 600 for training an autoencoder for use by Radio Access nodes configured to manage TPs that are members of a CoMP set, and by wireless devices in a coverage area of the CoMP set. The method is performed by a training agent, which may for example comprise an application or function, which may be instantiated within a Radio Access node, Core network node or in a cloud or fog deployment. Referring to FIG. 6, the method comprises, in a first step 610, obtaining results of measurements performed by a wireless device on communication channels to each of a plurality of TPs in the CoMP set. The method then comprises using the obtained results to train an autoencoder to compress a vector of measurement results in step 620, the autoencoder comprising an encoder part and a decoder part. In step 630, the method 600 comprises providing a representation of the decoder part of the autoencoder to Radio Access nodes configured to manage TPs that are members of the CoMP set, and a representation of the encoder part of the autoencoder to wireless devices that are in a coverage area of the CoMP set. The representation of the encoder part may be provided to wireless devices that are in a coverage area of the CoMP set via one or more Radio Access nodes configured to manage TPs that are members of the CoMP set.

Figure 7A:
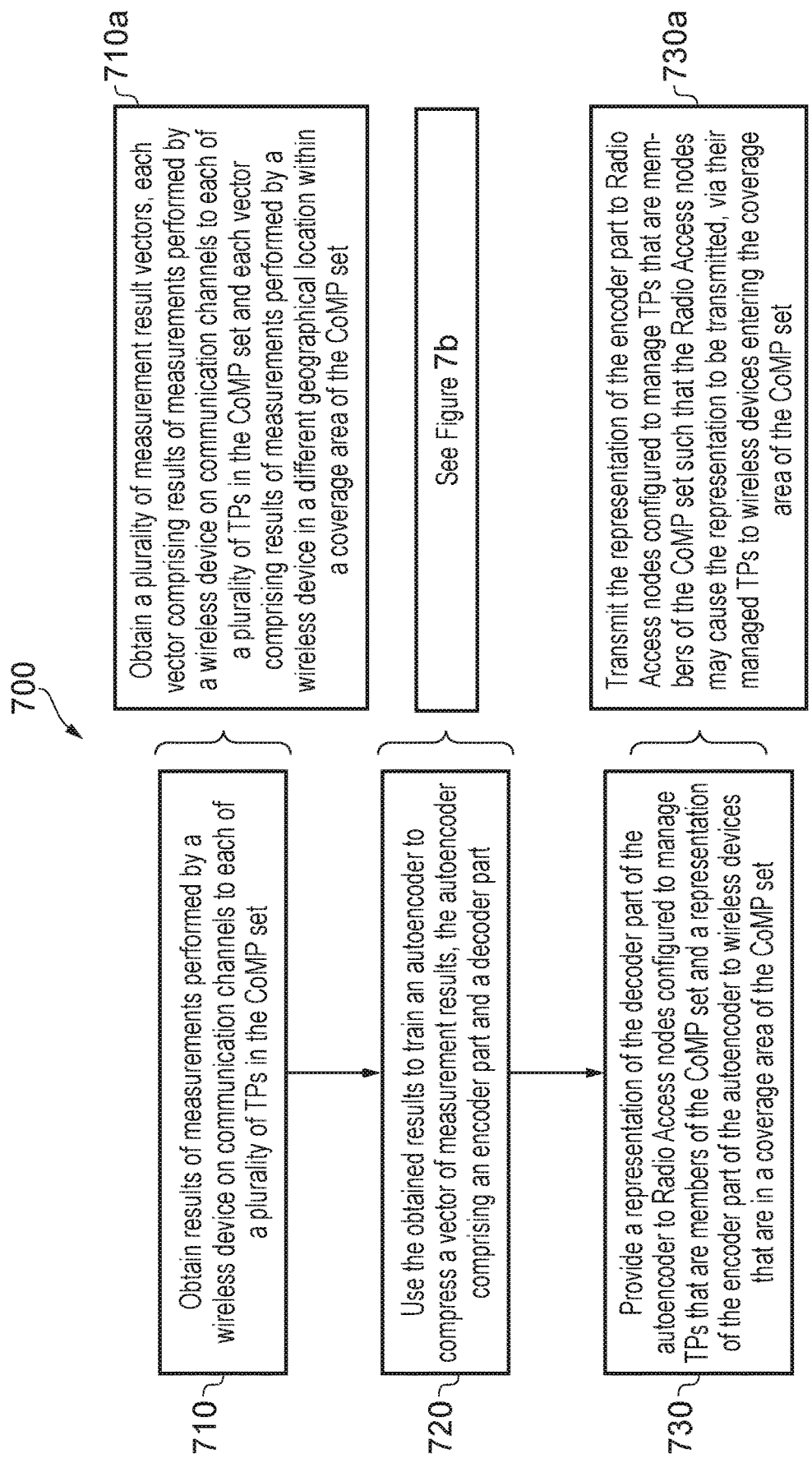
FIGS. 7a and 7b are flow charts illustrating process steps in another example of method performed by a training agent.
Figure 7B:
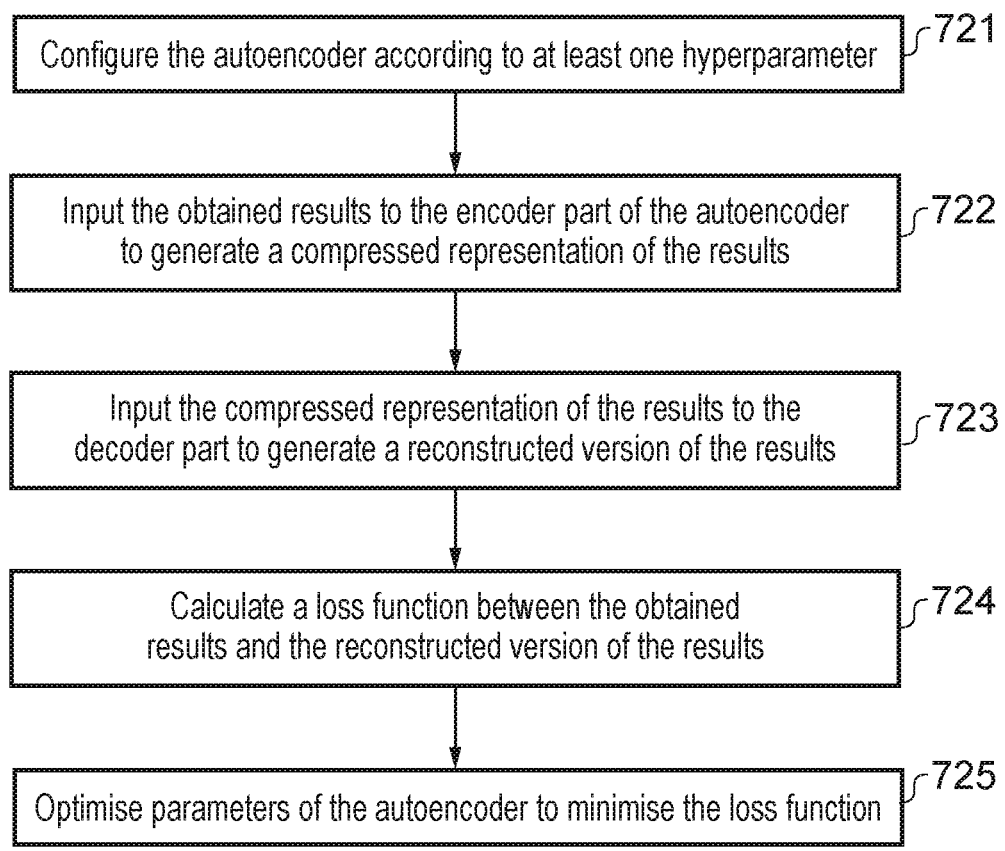

FIGS. 7a and 7b are flow charts illustrating another example of method 700 for training an autoencoder for use by Radio Access nodes configured to manage TPs that are members of a CoMP set, and by wireless devices in a coverage area of the CoMP set. The method 700 illustrates one way in which the steps of the method 600 may be implemented and supplemented in order to achieve the above discussed and additional functionality. As for the method 600, the method 700 is performed by a training agent, which may for example comprise an application or function, which may be instantiated within a Radio Access node, Core network node or in a cloud or fog deployment.

Referring to FIG. 7a, in a first step 710, the training agent obtains results of measurements performed by a wireless device on communication channels to each of a plurality of TPs in the CoMP set. As illustrated at 710a, this may comprise obtaining a plurality of measurement result vectors, each measurement result vector comprising results of measurements performed by a wireless device on communication channels to each of a plurality of TPs in the CoMP set. In some examples, each measurement result vector may comprise results of measurements performed by a wireless device in a different geographical location within a coverage area of the CoMP set. The measurement results may in some examples be obtained from one or more different wireless devices and at different times. For example, the measurement results may be obtained from a small group of wireless devices, or from a single wireless device that is moved around the coverage area of the CoMP set in order to obtain a range of measurement results that is representative of conditions across the coverage area. In another example, the measurement results may be obtained from a plurality of wireless devices that are geographically distributed across the coverage area of the CoMP set. The training agent may obtain the measurement results directly from the wireless device or via one or more other nodes or entities such as Radio Access serving the wireless devices. The training agent may request the measurement results or may receive them from the one or more wireless devices or other nodes or entities without having sent a specific request.

Referring still to FIG. 7a, in step 720, the training agent uses the obtained results to train an autoencoder to compress a vector of measurement results, the autoencoder comprising an encoder part and a decoder part. Detail of how this step may be carried out is illustrated in FIG. 7b.

Referring to FIG. 7b, in a first sub-step 721, the training agent configures the autoencoder according to at least one hyperparameter. It will be appreciated that a "hyperparameter" of a model is a parameter that is external to the model, and whose value cannot be estimated from data processed by the model but nonetheless shapes how the model learns its internal parameters. Model hyperparameters may be tuned for a given problem or use case. Examples of hyperparameters for a neural network based autoencoder may include a time interval for data processing, a scaling factor, and/or a layer number decreasing rate.

In sub-step 722, the training agent inputs the obtained results to the encoder part of the autoencoder to generate a compressed representation of the results. In sub-step 723, the training agent inputs the compressed representation of the results to the decoder part to generate a reconstructed version of the results. The training agent then calculates a loss function between the obtained results and the reconstructed version of the results in sub-step 724 and optimises parameters of the autoencoder in sub-step 725 to minimise the loss function. The parameters optimised may include the number of layers in the autoencoder, the number of neurons per layer and the weights on connections between neurons. The loss function may for example comprise a cross entropy loss function.

Referring again to FIG. 7a, and following training of the autoencoder at step 720, the training agent, in step 730, provides a representation of the decoder part of the autoencoder to Radio Access nodes configured to manage TPs that are members of the CoMP set, and a representation of the encoder part of the autoencoder to wireless devices that are in a coverage area of the CoMP set. As illustrated at 730a, providing a representation of the encoder part of the autoencoder to wireless devices that are in a coverage area of the CoMP set may comprise transmitting the representation of the encoder part to Radio Access nodes configured to manage TPs that are members of the CoMP set. In this manner, the Radio Access nodes may cause the representation to be transmitted, via their managed TPs, to wireless devices entering the coverage area of the CoMP set.

FIGS. 2 to 7b described above illustrate methods carried out at a wireless device, Radio Access node and training agent, which may cooperate to reduce the signalling load associated with provision of channel quality data to support CoMP transmission techniques such as joint transmission in the Downlink. There now follows a discussion of how aspects of these methods may be implemented in a wireless device, Radio Access node and training agent.

As discussed above, according to CoMP techniques, each wireless device (such as a UE) being served by a CoMP set should transmit its CSI information about the N links to the N TPs in the CoMP set to all participating Radio Access nodes. Each UE should therefore transmit $h_i \in C^N$ to all participating Radio Access nodes. Each participating Radio Access node collects this information from all K wireless devices being served by the CoMP set to form a set of K precoding vectors of length N to diagonalize the channel for joint transmission to K users.

From the received CSI information from all K users, each Radio Access node can form:

$$\tilde{H} = \begin{bmatrix} \tilde{h}_1^T \\ \tilde{h}_2^T \\ \vdots \\ \tilde{h}_K^T \end{bmatrix} \quad (3)$$

Where $\tilde{h}_1 \in C^N$ denotes complex conjugation of $h_i$ and can be used by each Radio Access node to encode data of the K users (i.e. $x \in C^K$) as shown below.

$$\tilde{x} = \tilde{H}x \quad (4)$$

When $x \in C^K$ is transmitted from N co-operating multipoints, the received signal can be demodulated with the diversity gain shown below:

$$y_i = \langle h_i^T, \tilde{x} \rangle + w_i$$
$$= \|h_i\|_2^2 x + w_i \quad (5)$$

Where $y_i$ is the received signal at the i-th wireless device. Here it is assumed that H. $\tilde{H}$ is a diagonal matrix, i.e. that $h_i$s are not only sparse but also orthogonal. This is a valid assumption as the geographical separation of the TPs renders the channels to the TPs uncorrelated.

Figure 8A:
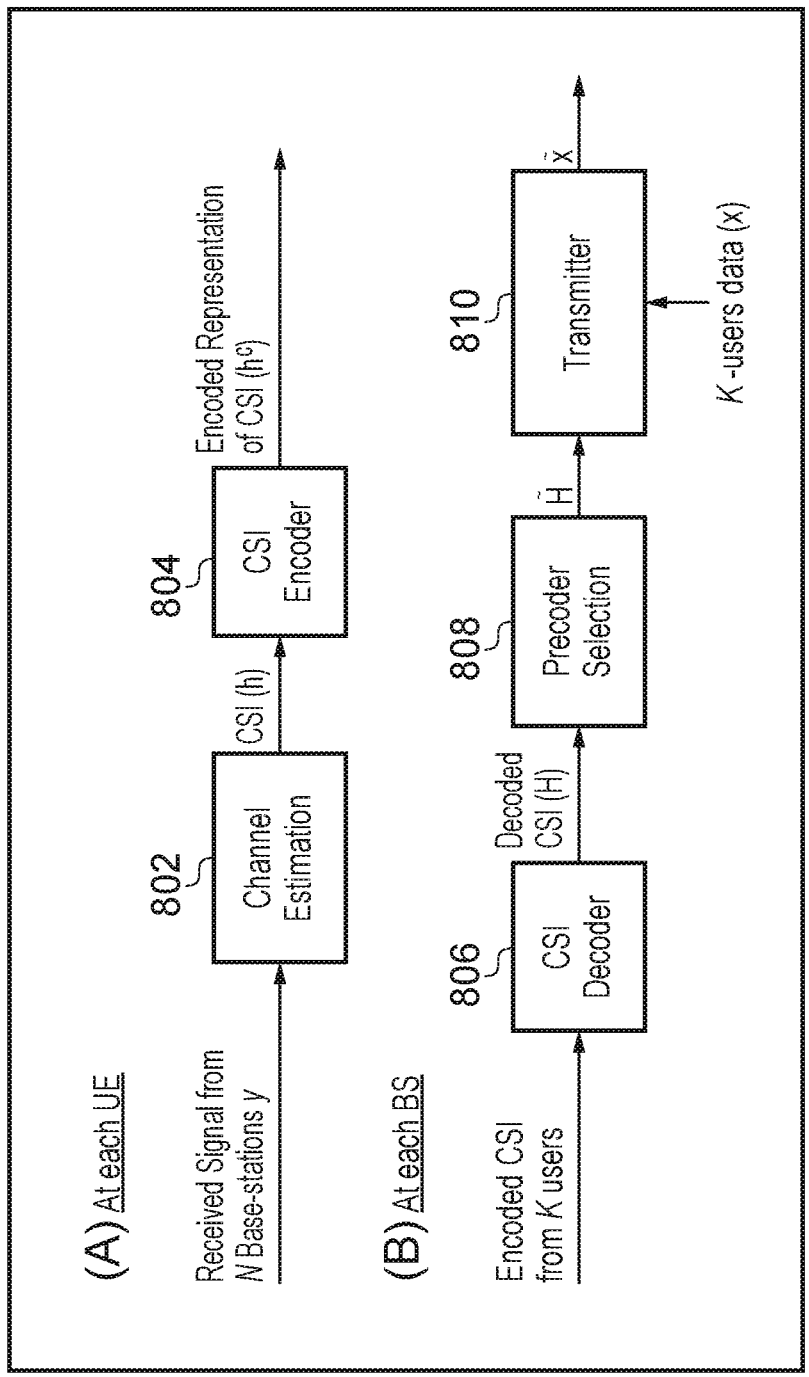
FIGS. 8a and 8b are block diagrams illustrating operations involved in channel state reporting.

FIG. 8a is a block diagram illustrating operations involved in CSI reporting by a wireless device in the form of a UE, and downlink joint transmission at for K users at a Radio Access node in the form of a Base Station (BS).

Referring to FIG. 8a, the Uplink CSI information for i-th user, $h_i \in C^N$, is obtained through channel estimation 802. Owing to the relatively few strong links to TPs participating in the CoMP set, the vector of CSI information to the different TPs is sparse. An autoencoder 804 can be trained (as discussed below) to reduce the dimensionality of the dimension N vector of Uplink CSI information to a dimension L vector, with L<<N. This reduces the amount of data for transmission to the participating Radio Access nodes without requiring the compressive-sampling dictionary of sparse signal processing methods. At each Radio Access node, the auto encoded CSI from K users are reconstructed in all N dimensions using the appropriate autodecoder 806. The reconstructed CSI vectors are used in selection of an appropriate precoder 808 before joint transmission 810 of signals to the users.

Figure 8B:
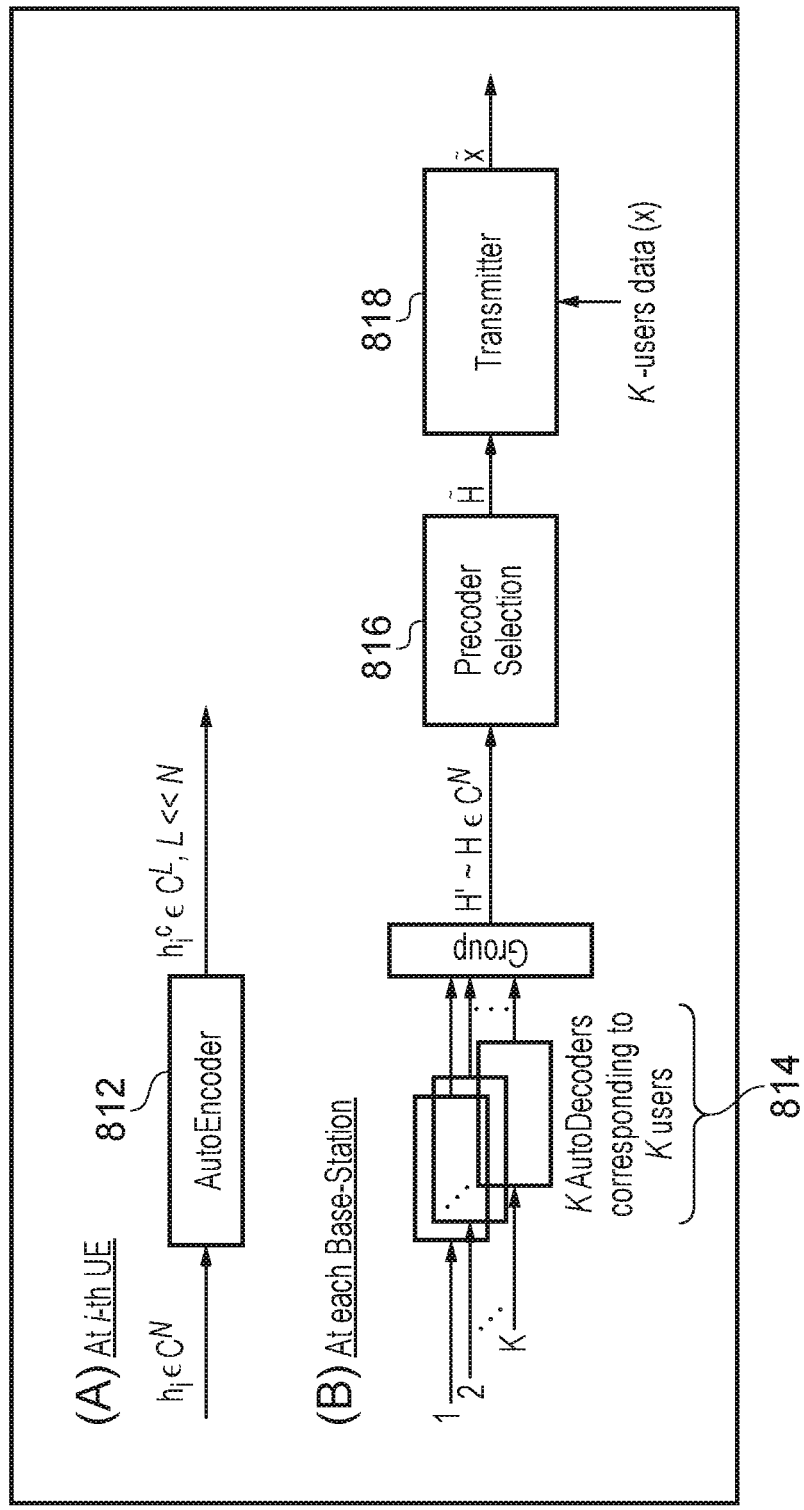

FIG. 8b illustrates further detail of the encoding and decoding process at a UE and Base Station. At the UE, the encoder part of an autoencoder 812 reduces the dimensionality of a vector of CSI information, compressing the CSI feedback so that can be transmitted using fewer network resources. At each Base Station, and for each UE being served by the CoMP set, a decoder part of the autoencoder 814 reconstructs CSI vectors from the received compressed CS vectors, allowing for precoder selection 816 and transmission 818.

Figure 9:
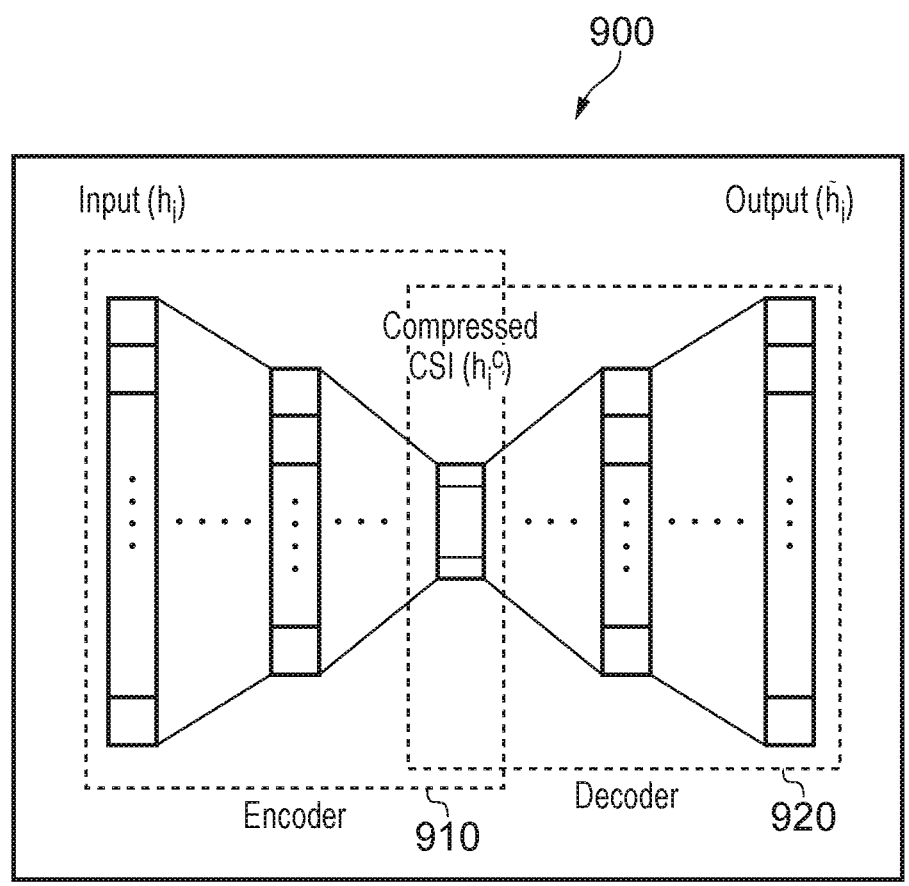
FIG. 9 illustrates an autoencoder structure suitable for use in the methods of the present disclosure.

An Autoencoder structure suitable for use in the methods of the present disclosure is illustrated in FIG. 9. The autoencoder 900 comprises an encoder part 910 which compress the input, concentrating the data by reducing its dimensionality while ensuring that essential or prominent features in the data are not lost. The autoencoder also comprises a decoder which reconstructs the original input signal, re-establishing the original dimensionality of the input. During training of the autoencoder, the number of layers, number of neurons per layer and weights of connections between neurons may be optimised. This training procedure may be carried out by a training agent, and may for example be a substantially offline procedure, with training data being collected during a training phase of network operation. The autoencoder is then trained by the training agent and the encoder and decoder parts of the autoencoder are then provided to wireless devices and Radio Access nodes respectively.

A typical training procedure is described below.

For the auto-encoder structure described above and illustrated in FIG. 9, C sets of downlink channel impulse response may be collected. These sets may be obtained from a single wireless device or small number of wireless devices that are moved around the coverage area of the CoMP set in a deliberate fashion to obtain data from a range of geographic locations. In other examples, the sets may be obtained from a significant number of wireless devices moving around within the coverage area of the CoMP set according to their users' requirements. The sets may be obtained directly from the wireless devices or from their serving Radio Access nodes. Each set is normalized such that, $h_i \in [0,1]^N$, $i \in [0, \ldots, C]$. The autoencoder is then trained using the normalised sets such that, as shown in FIG. 8b, the encoder part reduces the input dimension such that $h_i^c \in [0,1]^L$, with L<<N. The training ensures that the decoder part can accurately reconstruct the input, restoring the original dimension: $h'_i \in [0,1]^N$. The weights of the encoder and decoder parts are optimized for the collected sets to minimize a loss function. In one example, the loss-function is a cross-entropy as given below:

$$L(h, h') = \sum_{i=0}^{C} h_i \log(h'_i) + (1 - h_i)\log(1 - h'_i) \quad (6)$$

A training algorithm implementing the above described method is illustrated in FIG. 10. Once the training has converted to a solution, the encoder part of the auto encoder is provided to wireless device entering the coverage area of the CoMP set, for example via a serving Radio Access node following handover. The decoder part of the trained autoencoder is provided to Radio Access nodes that are members of the CoMP set.

As discussed above, the methods 200 to 700 are performed by a wireless device, Radio Access Node and training agent respectively. The present disclosure provides a wireless device, Radio Access Node and training agent which are adapted to perform any or all of the steps of the above discussed methods.

Figure 11:
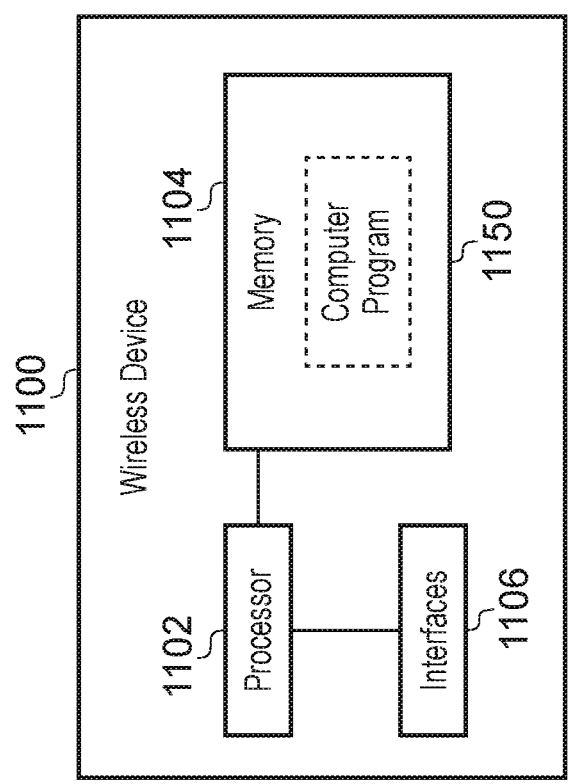
FIG. 11 is a block diagram illustrating functional modules in a wireless device.

FIG. 11 is a block diagram illustrating an example wireless device 1100 which may implement the method 200 and/or 300 according to examples of the present disclosure, for example on receipt of suitable instructions from a computer program 1150. Referring to FIG. 11, the wireless device 1100 comprises a processor or processing circuitry 1102, and may comprise a memory 1104 and interfaces 1106. The processing circuitry 1102 is operable to perform some or all of the steps of the method 200 and/or 300 as discussed above with reference to FIGS. 2 and 3. The memory 1104 may contain instructions executable by the processing circuitry 1102 such that the wireless device 1100 is operable to perform some or all of the steps of the method 200 and/or 300. The instructions may also include instructions for executing one or more telecommunications and/or data communications protocols. The instructions may be stored in the form of the computer program 1150. In some examples, the processor or processing circuitry 1102 may include one or more microprocessors or microcontrollers, as well as other digital hardware, which may include digital signal processors (DSPs), special-purpose digital logic, etc. The processor or processing circuitry 1102 may be implemented by any type of integrated circuit, such as an Application Specific Integrated Circuit (ASIC), Field Programmable Gate Array (FPGA) etc. The memory 1104 may include one or several types of memory suitable for the processor, such as read-only memory (ROM), random-access memory, cache memory, flash memory devices, optical storage devices, solid state disk, hard disk drive etc.

Figure 12:
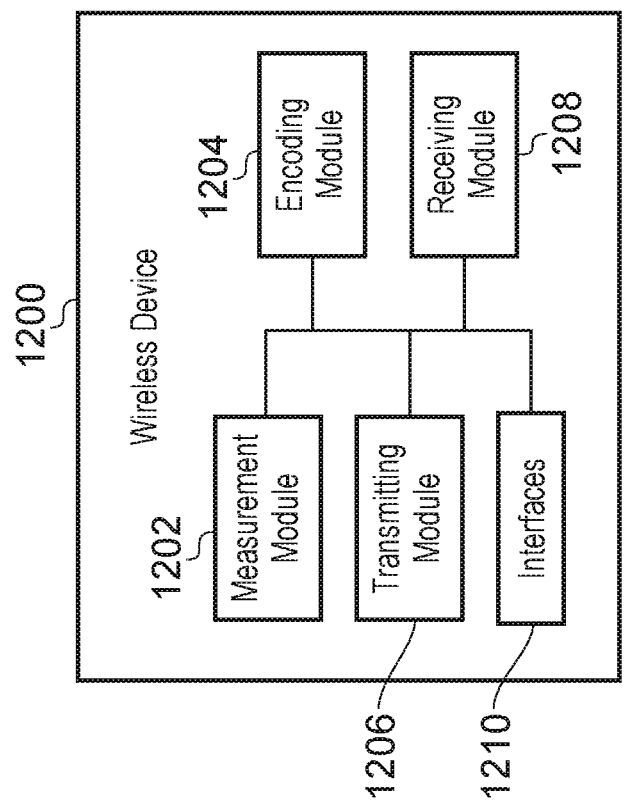
FIG. 12 is a block diagram illustrating functional modules in another example of wireless device.

FIG. 12 illustrates functional units in another example of wireless device 1200 which may execute examples of the methods 200 and/or 300 of the present disclosure, for example according to computer readable instructions received from a computer program. It will be understood that the units illustrated in FIG. 12 are functional units, and may be realised in any appropriate combination of hardware and/or software. The units may comprise one or more processors and may be integrated to any degree.

Referring to FIG. 12, the wireless device 1200 is operable to receive signals over a communication channel from a TP of a communication network, which TP is a member of a CoMP set. The wireless device 1200 comprises a measurement module 1202 for performing a measurement on communication channels to each of a plurality of TPs in the CoMP set, and an encoding module 1204 for using an autoencoder to compress a vector of measurement results of the performed measurements. The autoencoder comprises an autoencoder that has been trained by a training agent for use by wireless devices in a coverage area of the CoMP set. The wireless device further comprises a transmitting module 1206 for transmitting the compressed vector of measurement results to TPs in the CoMP set, and a receiving module 1208 for receiving a joint transmission from TPs in the CoMP set. The wireless device may further comprise interfaces 1210.

Figure 13:
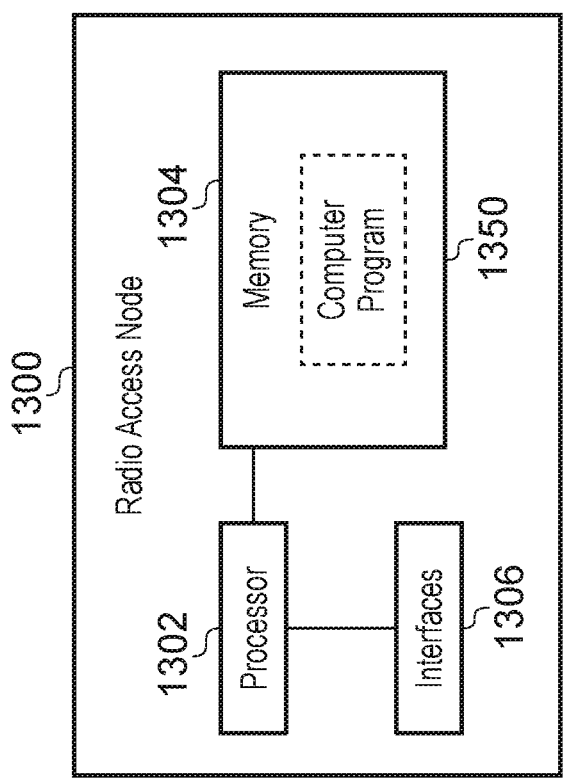
FIG. 13 is a block diagram illustrating functional modules in a Radio Access node.

FIG. 13 is a block diagram illustrating an example Radio Access node 1300 which may implement the method 400 and/or 500 according to examples of the present disclosure, for example on receipt of suitable instructions from a computer program 1350. Referring to FIG. 13, the wireless device 1300 comprises a processor or processing circuitry 1302, and may comprise a memory 1304 and interfaces 1306. The processing circuitry 1302 is operable to perform some or all of the steps of the method 400 and/or 500 as discussed above with reference to FIGS. 4 and 5. The memory 1304 may contain instructions executable by the processing circuitry 1302 such that the Radio Access node 1300 is operable to perform some or all of the steps of the method 400 and/or 500. The instructions may also include instructions for executing one or more telecommunications and/or data communications protocols. The instructions may be stored in the form of the computer program 1350. In some examples, the processor or processing circuitry 1302 may include one or more microprocessors or microcontrollers, as well as other digital hardware, which may include digital signal processors (DSPs), special-purpose digital logic, etc. The processor or processing circuitry 1302 may be implemented by any type of integrated circuit, such as an Application Specific Integrated Circuit (ASIC), Field Programmable Gate Array (FPGA) etc. The memory 1304 may include one or several types of memory suitable for the processor, such as read-only memory (ROM), random-access memory, cache memory, flash memory devices, optical storage devices, solid state disk, hard disk drive etc.

Figure 14:
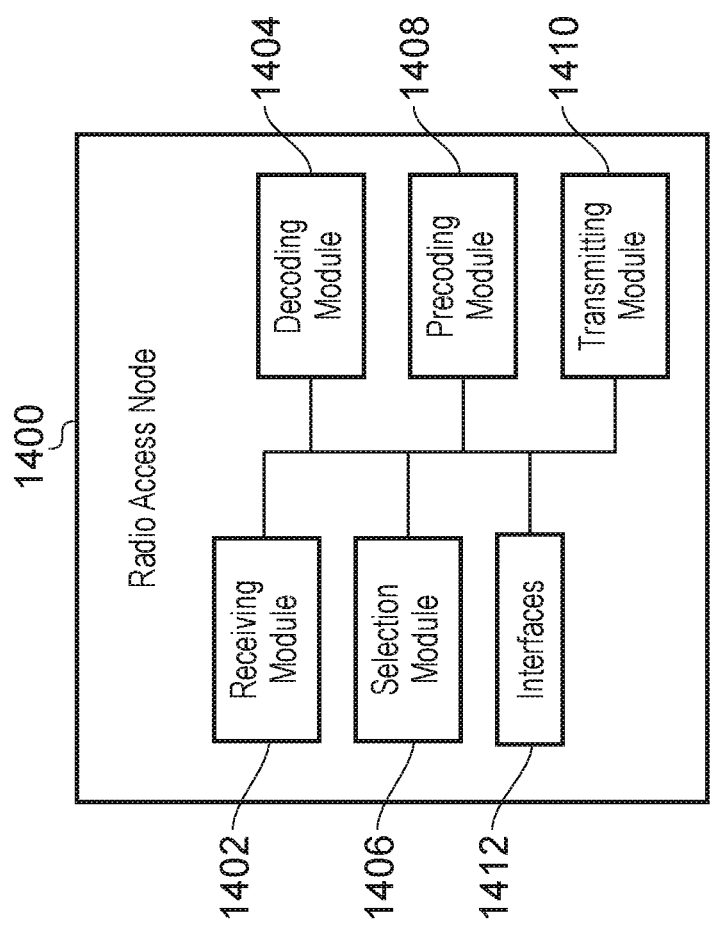
FIG. 14 is a block diagram illustrating functional modules in another example of Radio Access node.

FIG. 14 illustrates functional units in another example of Radio Access node 1400 which may execute examples of the methods 400 and/or 500 of the present disclosure, for example according to computer readable instructions received from a computer program. It will be understood that the units illustrated in FIG. 14 are functional units, and may be realised in any appropriate combination of hardware and/or software. The units may comprise one or more processors and may be integrated to any degree.

Referring to FIG. 14, the Radio Access node 1400 is configured to manage a TP that is a member of a CoMP set. The Radio Access node comprises a Receiving module 1402 for receiving from a wireless device a compressed vector of measurement results of measurements performed by the wireless device on communication channels to each of a plurality of TPs in the CoMP set. The Radio Access node 1400 further comprises a decoding module 1404 for using an autoencoder to reconstruct a vector of measurement results from the received compressed vector of measurement results, and a selection module 1406 for using the reconstructed vector of measurement results to form a precoding vector for transmissions to the wireless device. The autoencoder comprises an autoencoder that has been trained by a training agent for use by Radio Access nodes managing TPs that are members of the CoMP set. The Radio Access node 1400 further comprises a precoding module 1408 for encoding data for transmission to the wireless device using the precoding vector, and a transmission module 1410 for causing the encoded data to be transmitted to the wireless device. The Radio Access node 1400 may further comprise interfaces 1412.

Figure 15:
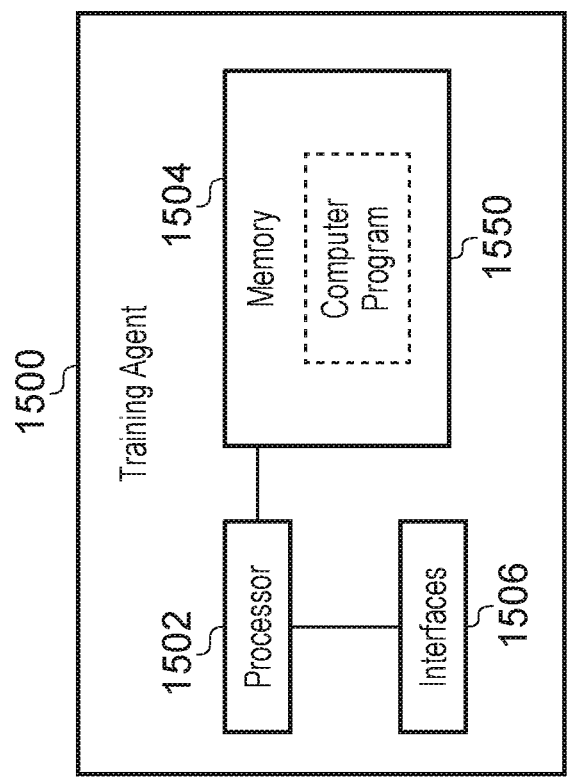
FIG. 15 is a block diagram illustrating functional modules in a training agent.

FIG. 15 is a block diagram illustrating an example training agent 1500 which may implement the method 600 and/or 700 according to examples of the present disclosure, for example on receipt of suitable instructions from a computer program 1550. Referring to FIG. 15, the training agent 1500 comprises a processor or processing circuitry 1502, and may comprise a memory 1504 and interfaces 1506. The processing circuitry 1502 is operable to perform some or all of the steps of the method 600 and/or 700 as discussed above with reference to FIGS. 6, 7a and 7b. The memory 1504 may contain instructions executable by the processing circuitry 1502 such that the training agent 1500 is operable to perform some or all of the steps of the method 600 and/or 700. The instructions may also include instructions for executing one or more telecommunications and/or data communications protocols. The instructions may be stored in the form of the computer program 1550. In some examples, the processor or processing circuitry 1502 may include one or more microprocessors or microcontrollers, as well as other digital hardware, which may include digital signal processors (DSPs), special-purpose digital logic, etc. The processor or processing circuitry 1502 may be implemented by any type of integrated circuit, such as an Application Specific Integrated Circuit (ASIC), Field Programmable Gate Array (FPGA) etc. The memory 1504 may include one or several types of memory suitable for the processor, such as read-only memory (ROM), random-access memory, cache memory, flash memory devices, optical storage devices, solid state disk, hard disk drive etc.

Figure 16:
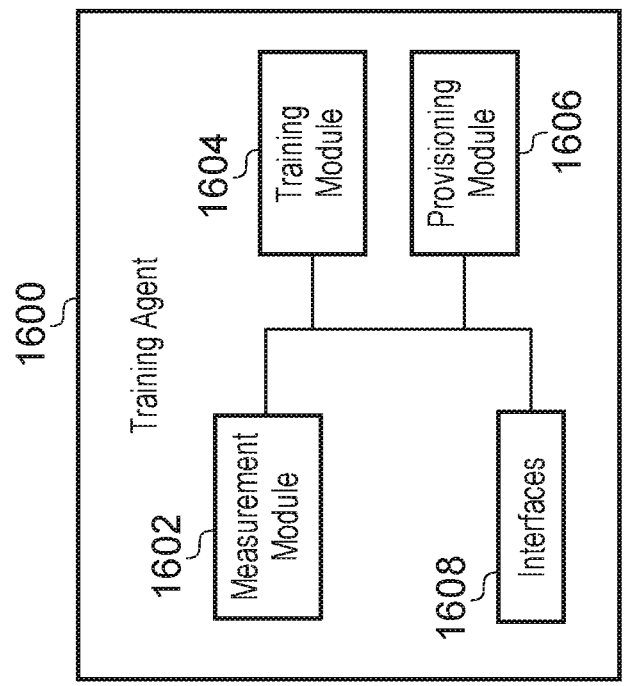
FIG. 16 is a block diagram illustrating functional modules in another example of training agent.

FIG. 16 illustrates functional units in another example of training agent 1600 which may execute examples of the methods 600 and/or 700 of the present disclosure, for example according to computer readable instructions received from a computer program. It will be understood that the units illustrated in FIG. 16 are functional units, and may be realised in any appropriate combination of hardware and/or software. The units may comprise one or more processors and may be integrated to any degree.

Referring to FIG. 16, the training agent 1500 is for training an autoencoder for use by Radio Access nodes configured to manage TPs that are members of a CoMP set, and by wireless devices in a coverage area of the CoMP set. The training agent 1600 comprises a measurement module 1602 for obtaining results of measurements performed by a wireless device on communication channels to each of a plurality of TPs in the CoMP set. The training agent 1600 further comprises a training module 1604 for using the obtained results to train an autoencoder to compress a vector of measurement results, the autoencoder comprising an encoder part and a decoder part. The training agent 1600 further comprises a provisioning module 1606 for providing a representation of the decoder part of the autoencoder to Radio Access nodes configured to manage TPs that are members of the CoMP set, and a representation of the encoder part of the autoencoder to wireless devices that are in a coverage area of the CoMP set.

Aspects of the present disclosure, as demonstrated by the above discussion, provide methods, a wireless device, Radio access node and training agent that may cooperate to reduce Uplink feedback for CoMP transmission schemes. Aspects of the present disclosure propose to train an autoencoder for use in compressing CSI feedback before transmission by wireless devices, and for use in reconstructing such feedback at Radio Access nodes. Aspects of the present disclosure do not require a compressive sampling dictionary, as is the case for sparse signal processing methods. Aspects of the present disclosure thus reduce Uplink control signal transmission without compromising on the macro diversity gain in the downlink transmission. The reduced Uplink transmission eases Uplink interference in the network and can improve the overall health of the network, in addition to improving battery performance of wireless devices.

The invention claimed is:

1. A method performed by a wireless device, wherein the wireless device is operable to receive signals over a communication channel from a Transmission Point (TP) of a communication network, which TP is a member of a Coordinated Multipoint (CoMP) set, the method comprising:
    performing a measurement on communication channels to each of a plurality of TPs in the CoMP set;
    using an autoencoder to compress a vector of measurement results of the performed measurements;
    transmitting the compressed vector of measurement results to TPs in the CoMP set; and
    receiving a joint transmission from TPs in the CoMP set;
    wherein the autoencoder comprises an autoencoder that has been trained by a training agent for use by wireless devices in a coverage area of the CoMP set.

2. The method of claim 1, wherein using the autoencoder to compress the vector of measurement results of the performed measurements comprises inputting the vector of measurement results to an encoder part of the autoencoder, wherein the encoder part and a decoder part of the autoencoder have been trained using training data assembled from communication channel measurements performed by at least one wireless device located in the coverage area of the CoMP set.

3. The method of claim 1, further comprising:
    receiving a representation of the encoder part of the autoencoder from a TP in the CoMP set.

4. The method of claim 3, wherein the receiving comprises receiving the representation of the encoder part following handover to a serving cell to which the TP belongs.

5. The method of claim 3, wherein the representation of the encoder part of the autoencoder comprises at least one of:
    a number of layers in the encoder part;
    a number of neurons in each layer of the encoder part; and
    weights for connections between the neurons of the encoder part.

6. A method performed by a Radio Access node, wherein the Radio Access node is configured to manage a Transmission Point (TP) that is a member of a Coordinated Multipoint (CoMP) set, the method comprising:
    receiving from a wireless device a compressed vector of measurement results of measurements performed by the wireless device on communication channels to each of a plurality of TPs in the CoMP set;
    using an autoencoder to reconstruct a vector of measurement results from the received compressed vector of measurement results;
    using the reconstructed vector of measurement results to form a precoding vector for transmissions to the wireless device;
    encoding data for transmission to the wireless device using the precoding vector; and
    causing the encoded data to be transmitted to the wireless device;
    wherein the autoencoder comprises an autoencoder that has been trained by a training agent for use by Radio Access nodes managing TPs that are members of the CoMP set.

7. The method of claim 6, wherein using the autoencoder comprises inputting the vector of measurement results to a decoder part of the autoencoder, wherein the decoder part and an encoder part of the autoencoder have been trained using training data assembled from communication channel measurements performed by at least one wireless device located in the coverage area of the CoMP set.

8. The method of claim 6, further comprising:
    receiving a representation of the encoder part of the autoencoder from a training agent; and
    causing the representation of the encoder part of the autoencoder to be transmitted to a wireless device.

9. The method of claim 8, causing the representation of the encoder part of the autoencoder to be transmitted to the wireless device comprises causing the representation of the encoder part to be transmitted following handover of the wireless device to the cell served by the Radio Access node.

10. The method of claim 8, wherein the representation of the encoder and/or decoder part of the autoencoder comprises at least one of:
- a number of layers in the encoder and/or decoder part;
- a number of neurons in each layer of the encoder and/or decoder part; and
- weights for connections between the neurons of the encoder and/or decoder part.

11. A wireless device that is operable to receive signals over a communication channel from a Transmission Point (TP) of a communication network, which TP is a member of a Coordinated Multipoint (CoMP) set, the wireless device comprising processing circuitry configured to cause the wireless device to:
- perform a measurement on communication channels to each of a plurality of TPs in the CoMP set;
- use an autoencoder to compress a vector of measurement results of the performed measurements;
- transmit the compressed vector of measurement results to TPs in the CoMP set; and
- receive a joint transmission from TPs in the CoMP set;
- wherein the autoencoder comprises an autoencoder that has been trained by a training agent for use by wireless devices in a coverage area of the CoMP set.

12. The wireless device of claim 11, wherein using the autoencoder comprises inputting the vector of measurement results to an encoder part of the autoencoder, wherein the encoder part and a decoder part of the autoencoder have been trained using training data assembled from communication channel measurements performed by at least one wireless device located in the coverage area of the CoMP set.

13. The wireless device of claim 11, further comprising:
- receiving a representation of the encoder part of the autoencoder from a TP in the CoMP set.

14. The wireless device of claim 13, wherein receiving the representation comprises receiving the representation of the encoder part following handover to a serving cell to which the TP belongs.

15. The wireless device of claim 13, wherein the representation of the encoder part of the autoencoder comprises at least one of:
- a number of layers in the encoder part;
- a number of neurons in each layer of the encoder part;
- weights for connections between the neurons of the encoder part.

16. A Radio Access node that is configured to manage a Transmission Point (TP) that is a member of a Coordinated Multipoint (CoMP) set; the Radio Access node comprising processing circuitry configured to cause the Radio Access node to:
- receive from a wireless device a compressed vector of measurement results of measurements performed by the wireless device on communication channels to each of a plurality of TPs in the CoMP set;
- use an autoencoder to reconstruct a vector of measurement results from the received compressed vector of measurement results;
- use the reconstructed vector of measurement results to form a precoding vector for transmissions to the wireless device;
- encode data for transmission to the wireless device using the precoding vector; and
- cause the encoded data to be transmitted to the wireless device;
- wherein the autoencoder comprises an autoencoder that has been trained by a training agent for use by Radio Access nodes configured to manage TPs that are members of the CoMP set.

17. The radio access node of claim 16, wherein using the autoencoder comprises inputting the vector of measurement results to a decoder part of the autoencoder, wherein the decoder part and an encoder part of the autoencoder have been trained using training data assembled from communication channel measurements performed by at least one wireless device located in the coverage area of the CoMP set.

18. The radio access node of claim 16, further comprising:
- receiving a representation of the encoder part of the autoencoder from the training agent; and
- causing the representation of the encoder part of the autoencoder to be transmitted to a wireless device.

19. The radio access node of claim 18, causing the representation of the encoder part of the autoencoder to be transmitted to a wireless device comprises causing the representation of the encoder part to be transmitted following handover of the wireless device to the cell served by the Radio Access node.

20. The radio access node of claim 18, wherein the representation of the encoder and/or decoder part of the autoencoder comprises at least one of:
- a number of layers in the encoder and/or decoder part;
- a number of neurons in each layer of the encoder and/or decoder part;
- weights for connections between the neurons of the encoder and/or decoder part.

* * * * *